United States Patent [19]

Tanaka et al.

[11] Patent Number: 5,105,304
[45] Date of Patent: Apr. 14, 1992

[54] ACOUSTO-OPTIC MODULATION DEVICE

[75] Inventors: Satoru Tanaka; Yasushi Murata; Fumio Matsui, all of Saitama, Japan

[73] Assignee: Pioneer Electronic Corporation, Tokyo, Japan

[21] Appl. No.: 529,456

[22] Filed: May 29, 1990

[30] Foreign Application Priority Data

Jul. 5, 1989 [JP] Japan .................. 1-173810

[51] Int. Cl.$^5$ .................................. G02F 1/11
[52] U.S. Cl. ............................ 359/287; 359/285
[58] Field of Search .............. 350/358, 96.13, 96.14, 350/355; 372/13

[56] References Cited

U.S. PATENT DOCUMENTS

| 4,118,113 | 10/1978 | Chang et al. | 350/358 |
| 4,381,887 | 5/1983 | Guerin et al. | 350/358 |
| 4,443,066 | 4/1984 | Freyre | 350/358 |

FOREIGN PATENT DOCUMENTS

| 0149023 | 6/1989 | Japan | 350/358 |
| 0146786 | 6/1990 | Japan | 372/13 |

OTHER PUBLICATIONS

O. Bryngdahl, "Frequency Modulation of a Light Beam by Use of Acoustical Fields", IBM Technical Disclosure Bulletin, vol. 13, No. 2, 7/70.

Primary Examiner—Rolf Hille
Assistant Examiner—Tan Ho
Attorney, Agent, or Firm—Wegner, Cantor, Mueller & Player

[57] ABSTRACT

An acousto-optical modulation device comprises a plurality of acousto-optic modulators arranged in series with each other, to receive a zero-order light from a previous stage of the modulators. A zero-order light emerging from the last stage is used as a modulated light of an incident light. The coefficient of extinction for the zero-order light is raised by this structure, and the acousto-optic modulation device presents a high diffraction efficiency and a high value of the coefficient of extinction at the same time.

2 Claims, 2 Drawing Sheets

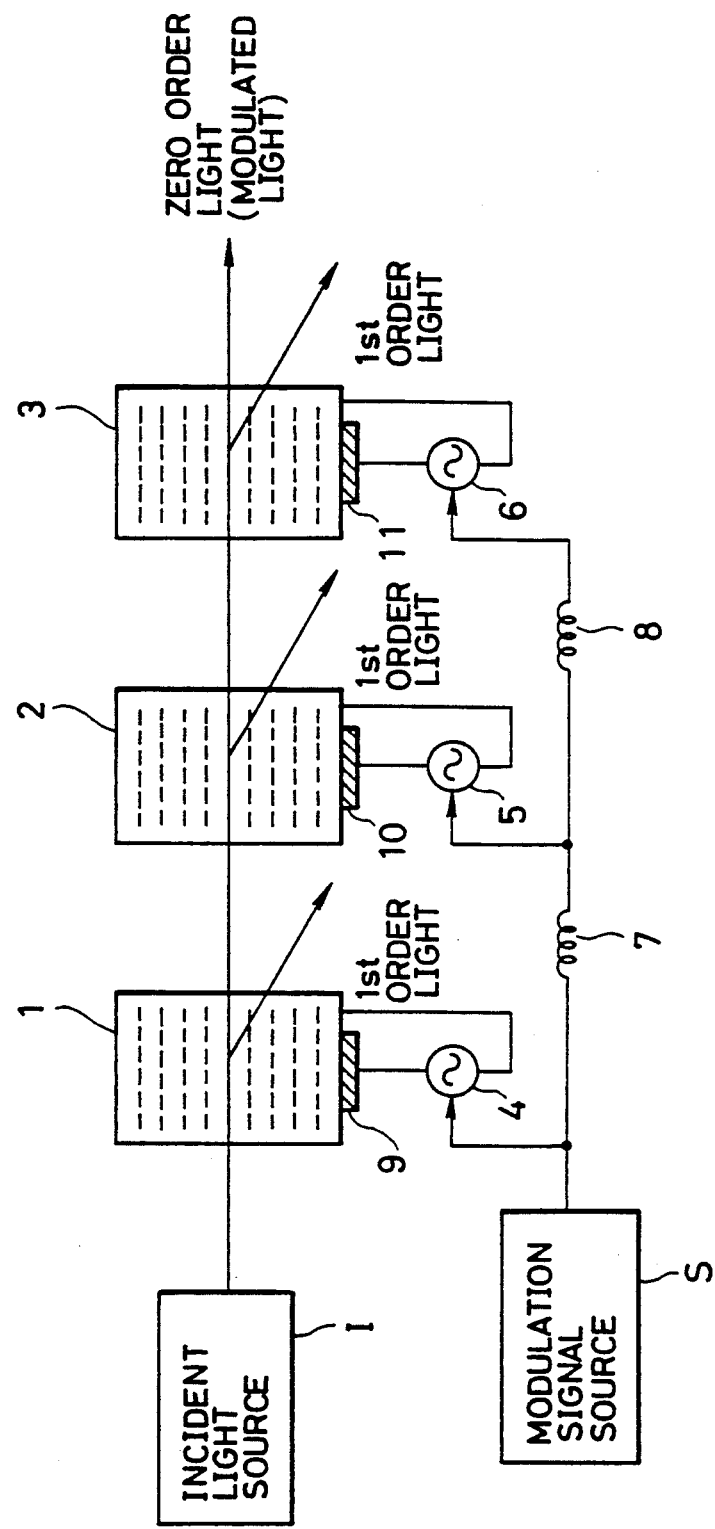

ACOUSTO-OPTIC MODULATION DEVICE

BACKGROUND OF THE INVENTION

1. Field of the Invention

The present invention relates to an acousto-optic modulation device.

2. Description of Background Information

An example of the structure of acousto-optic modulation device (referred to as A/O modulator hereinafter) that is a sort of light modulator, is illustrated in FIG. 1. As shown in the figure, an oscillator element 32 made of a piezoelectric element for example is provided on an end surface of a solid block 31 of a transparent medium such as quartz glass. A high-frequency voltage having a magnitude corresponding to the signal level of a modulation signal is applied to the oscillator element 32 by means of a high-frequency oscillator 33.

In the A/O modulator having the structure described above, ultrasonic vibrations are generated in the solid block 31 by the application of the high-frequency voltage to the oscillator element 32. By these ultrasonic vibrations, high and low density portions appear in the medium. As a result, the distribution of refractive index for light changes periodically, forming a laminar distribution. This change of refractive index, on the other hand, functions as a phase type diffraction lattice, to diffract the incident light, whose direction is parallel to the wavefront of the ultrasonic wave entering sideways, into several directions. Especially, under the Bragg's condition, diffraction lights of higher orders are canceled by the effect of interference, so that there remain only first order diffraction lights. In this way, the incident light is divided into a zero order light and the first order lights.

When this A/O modulator is used, for example, for modulating a laser light in a laser projection type display unit, normally the first order light is used as the modulation light because the coefficient of extinction can be made larger for the first order light than the zero order light. The term "coefficient of extinction" represents the ratio Imin/Imax (or its inverse number) between the minimum value Imin and the maximum value Imax of the intensity of output light in the light intensity modulation.

However, if the first order light is used as the modulation light, a problem arises that the efficiency of diffraction is not sufficiently high even though a high value of the coefficient of extinction can be attained. Theoretically, the efficiency of diffraction can be raised by making the length L of the oscillation element 32 longer. This, however, is a difficult requirement in view of manufacturing techniques.

OBJECT AND SUMMARY OF THE INVENTION

An object of the present invention is therefore to provide an acousto-optic modulation device which functions with a high diffraction efficiency as well as a high value of the coefficient of extinction.

The acousto-optic modulation device according to the present invention comprises a plurality of A/O modulators connected in series with each other, each receiving a zero-order light emerging from a previous stage as an incident light. The modulation signal is sequentially applied to the A/O modulators in accordance with the timing of transmission of the zero-order light in each of the A/O modulators, and a zero-order light emerged from the last stage is used as a modulated light.

Thus, the zero-order light to be used as the modulated light passes through a plurality of A/O modulators, so that the zero-order light is modulated the plurality of times. In this way, the value of the coefficient of extinction for the zero-order light which was lower than that for the first order light is raised in the structure according to the present invention.

BRIEF DESCRIPTION OF THE DRAWINGS

FIG. 2 is a diagram showing the structure of an embodiment of the present invention.

DETAILED DESCRIPTION OF A PREFERRED EMBODIMENT

The embodiment of the present invention will be described in detail with reference to the accompanying drawings.

Figure 1:
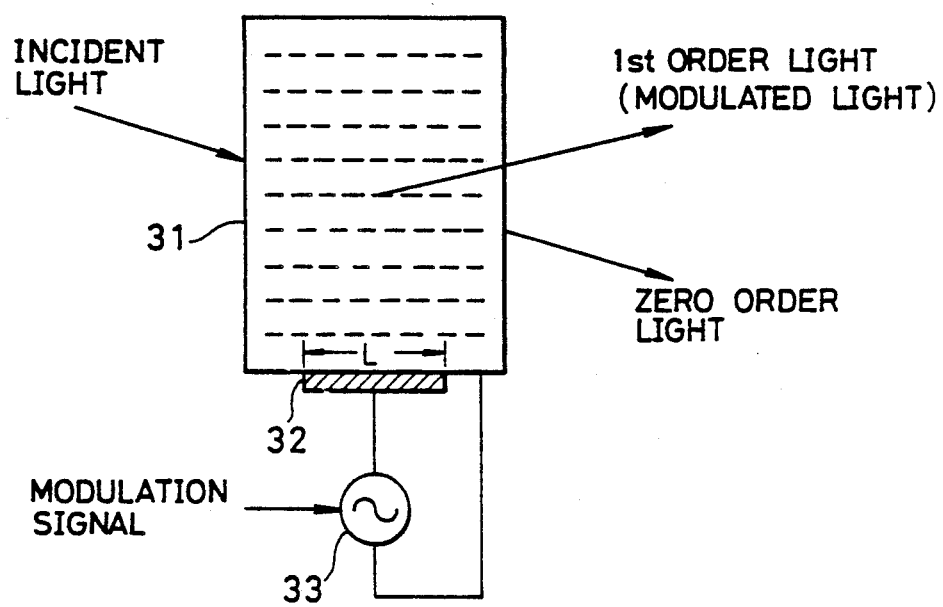
FIG. 1 is a diagram showing the structure of an example of A/O modulator.

The acousto-optic device according to the present invention shown in FIG. 2 is comprised of three A/O modulators 1, 2 and 3, for example. Each of the A/O modulators 1, 2 and 3 has a structure as shown in FIG. 1, and the A/O modulators 1, 2 and 3 are arranged in series with each other so that a zero-order light from a previous stage is received as an incident light and a zero-order light emerges from the last stage is to be used as the modulated light. In addition, the A/O modulator 1 of the first stage directly receives an incident light from an incident light source I. On the other hand a modulation signal is supplied from a modulation signal source S, and the modulation signal is directly supplied to a high-frequency oscillator 4 of the A/O modulator 1 of the first stage. The modulation signal is supplied to a high-frequency oscillator 5 of the A/O modulator 2 of the second stage through a delay line 7, and further the modulation signal past the delay line 7 is supplied to a high-frequency oscillator 6 of the A/O modulator 3 of the third stage through a delay line 8. The delay time of the delay lines 7 and 8 is determined in accordance with the propagation time of the zero-order light between the A/O modulators. By this arrangement, the modulation signal is sequentially applied to the oscillation elements 9, 10 and 11 of the A/O modulators 1, 2 and 3 in accordance with the timing of transmission of the zero-order light passing through the A/O modulators 1, 2 and 3.

Figure 3:
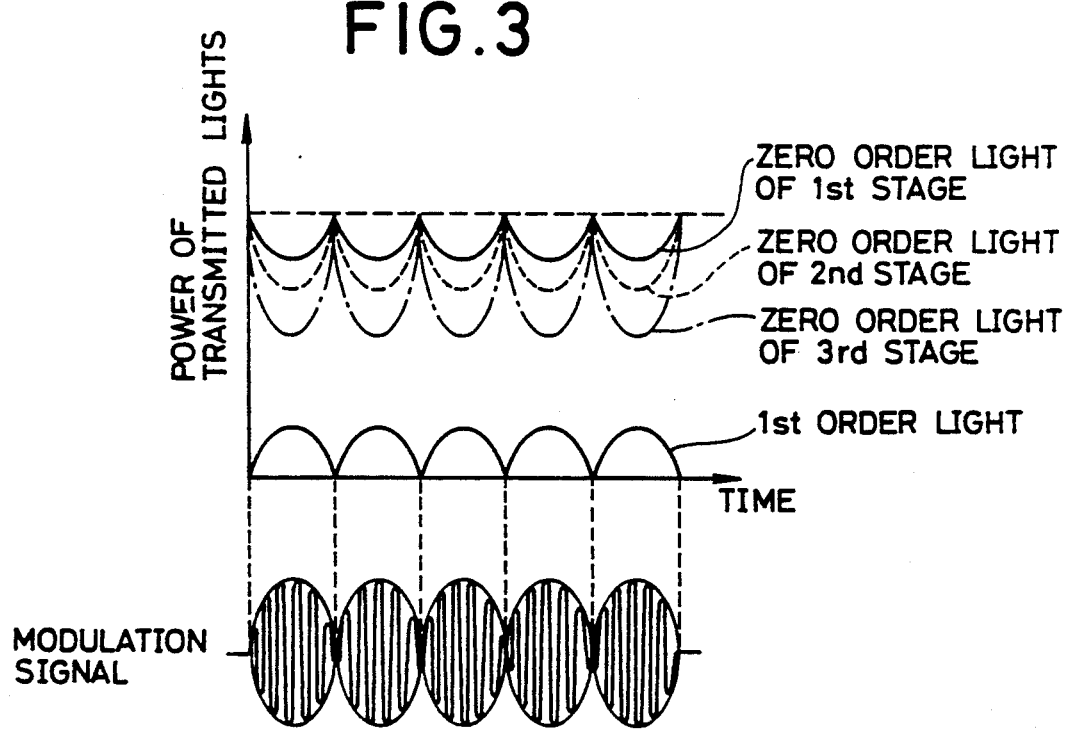
FIG. 3 is a diagram showing power characteristics of transmitted lights.

In this way, the incident light is modulated by means of the A/O modulators 1, 2 and 3 which are arranged in series with each other at three stages, for example. Furthermore the zero order light is sequentially introduced to the next stage without using the first order light having a low diffraction efficiency, and the zero order light in the last stage is derived as the modulated light. Therefore, the zero-order light is modulated a plurality of times, and the transmitted lights (the zero-order light and the first-order light) will have power characteristics as shown in FIG. 3. As clearly shown in this figure, the coefficient of extinction for the zero-order light becomes higher as it passes through each of the A/O modulators, and the coefficient of extinction for the zero-order light which was lower than that for the first-order light in the first stage can be raised sufficiently.

In the embodiment described above, the number of stages of the A/O modulators was three. However, this number is not limitative, and an arbitrary number of stages can be employed at need since the coefficient of extinction increases as the number of stages of the A/O modulator increases.

As specifically explained above, the acousto-optic modulation device according to the present invention is constructed such that an incident light is modulated by a plurality of A/O modulators which a arranged in series with each other to from the plurality of stages, a zero-order light is in turn introduced to the next stage, and the zero-order light emerging from the last stage is used as the modulated light. Therefore, the zero-order light is modulated a plurality of times, and the coefficient of extinction for the zero-order light which is lower than that for the first-order light can be raised sufficiently.

Thus, an acousto-optic modulation device having a sufficiently high diffraction efficiency and a sufficiently high coefficient of extinction is provided by the present invention.

What is claimed is:

1. An acousto-optic modulation device for producing a modulated beam of light, said device comprising:

a plurality of acousto-optic modulators arranged in series with each other so as to define a first stage and at least one secondary stage, wherein said first stage is adapted to receive a beam of incident light, and wherein said at least one secondary stage is arranged to receive zero-order light from a previous stage; and modulation signal applying means for sequentially applying a modulation signal to said plurality of acousto-optic modulators in accordance with timing of transmission of the zero-order light in each of said plurality of acousto-optic modulators, said modulation signal applying means including delay means for delaying said modulation signal between said first stage and said at least one secondary stage, wherein a zero-order light emerging from the last stage of said plurality of acousto-optic modulators is derived as the modulated beam of light.

2. The acousto-optic modulation device of claim 1, wherein each of said plurality of acousto-optic modulators comprises a solid block of a transparent media and an oscillation element fixed to said solid block.

* * * * *